April 24, 1956 W. D. HERSHBERGER 2,743,366
FREQUENCY-STABILIZATION BY PARTICLE BEAMS
Filed July 22, 1949 4 Sheets-Sheet 1
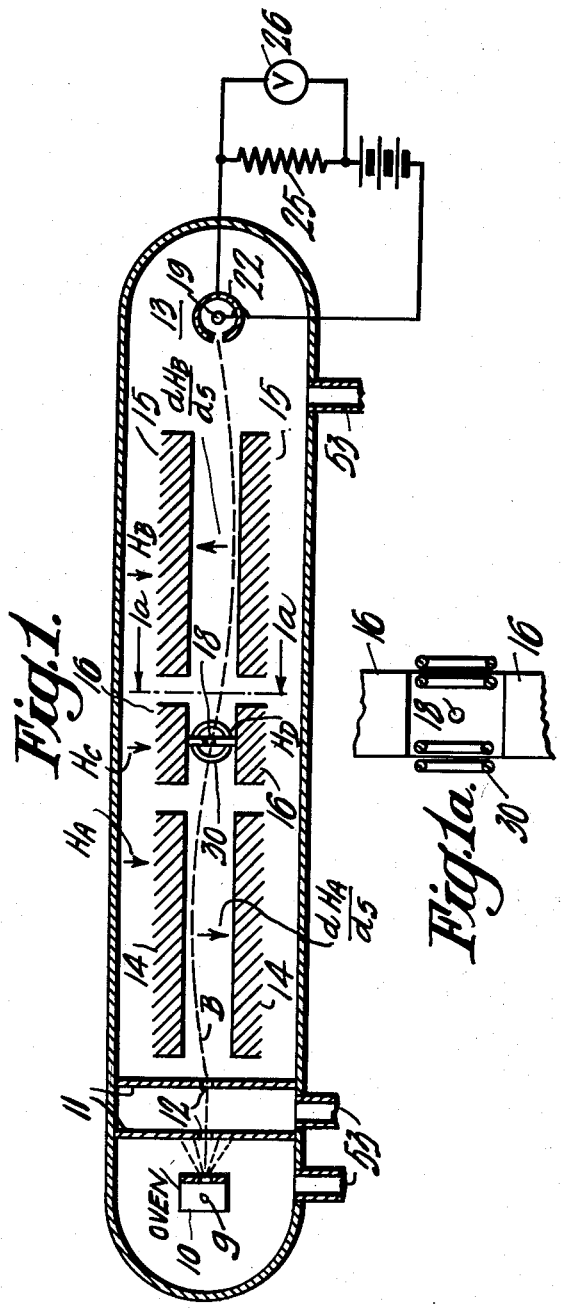
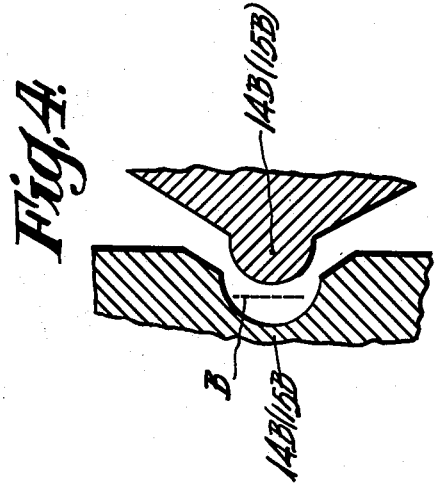
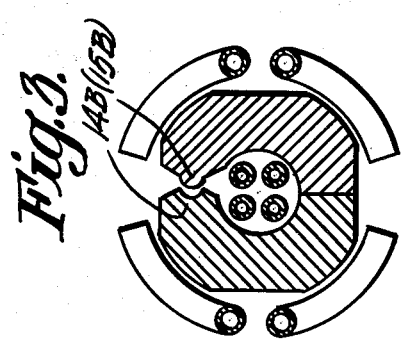
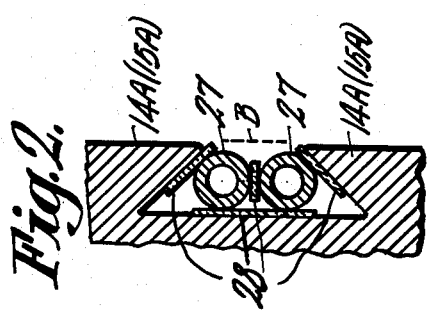
INVENTOR
William D. Hershberger
BY
ATTORNEY

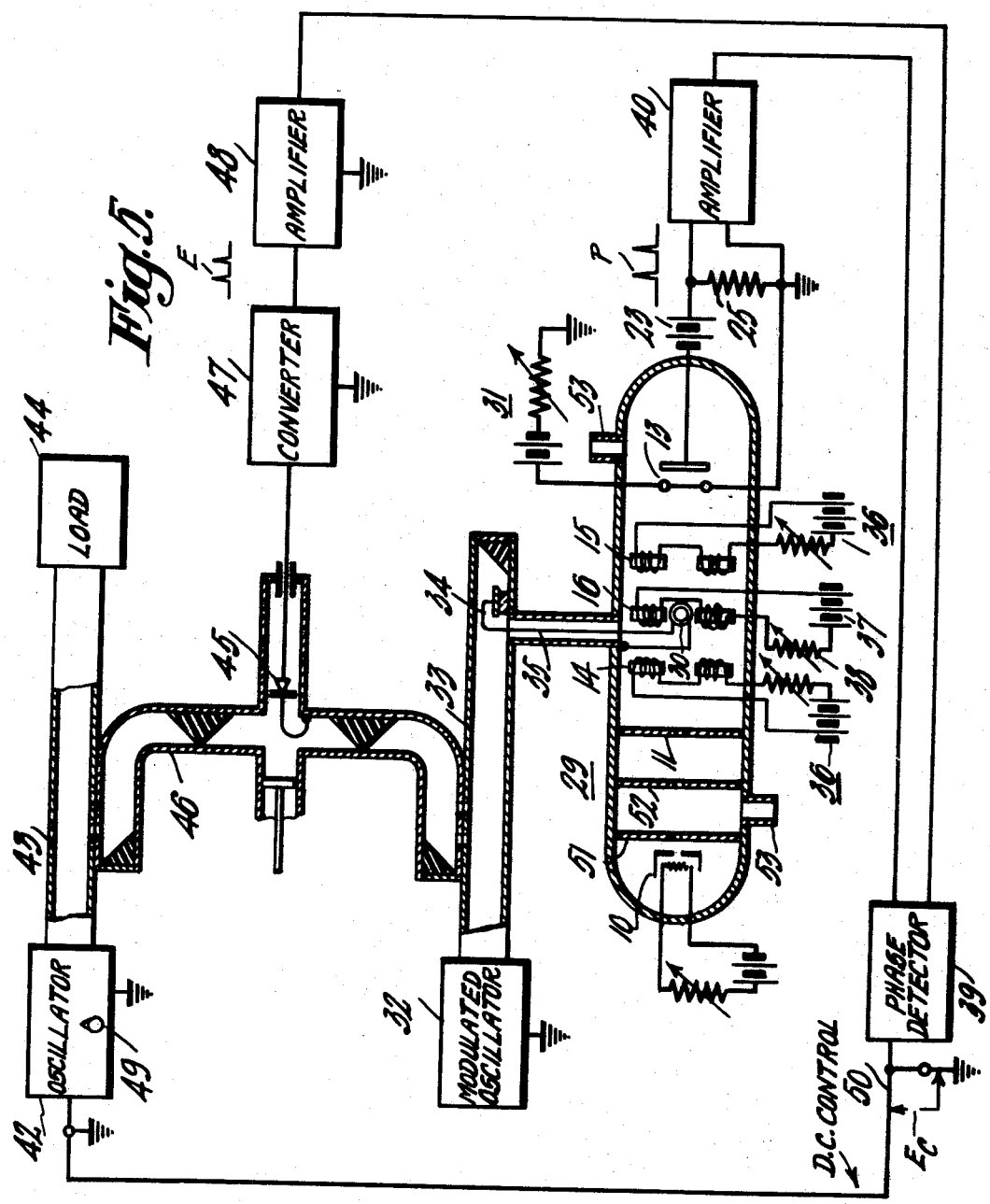

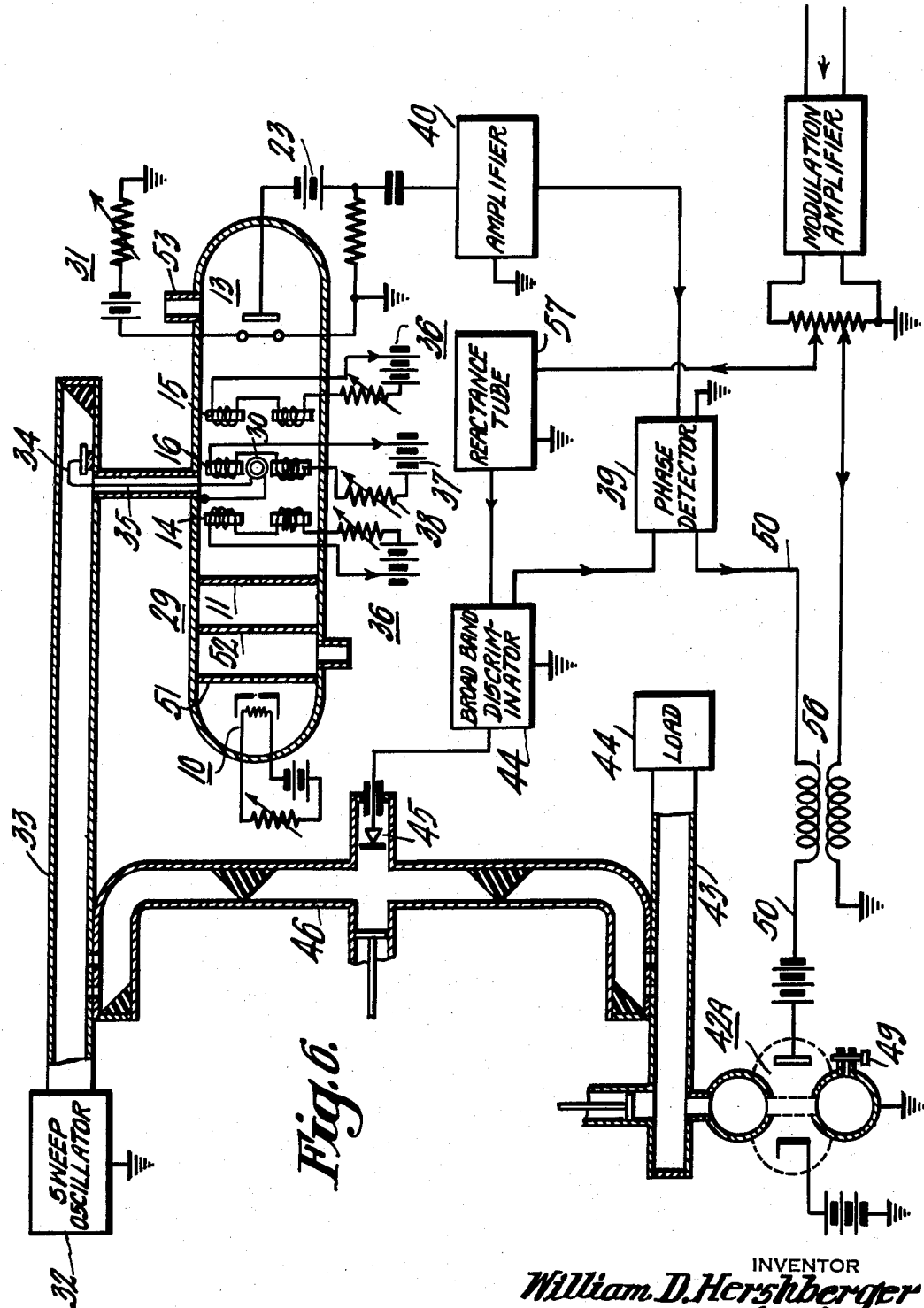

April 24, 1956     W. D. HERSHBERGER     2,743,366
FREQUENCY-STABILIZATION BY PARTICLE BEAMS
Filed July 22, 1949     4 Sheets-Sheet 4

INVENTOR
William D. Hershberger
BY
ATTORNEY

United States Patent Office 2,743,366
Patented Apr. 24, 1956

2,743,366

FREQUENCY-STABILIZATION BY PARTICLE BEAMS

William D. Hershberger, Princeton, N. J., assignor to Radio Corporation of America, a corporation of Delaware Application July 22, 1949, Serial No. 106,237

16 Claims. (Cl. 250—36)

This invention relates to stabilization of the frequency of oscillators, particularly microwave oscillators, by systems and methods utilizing the effects of magnetic fields upon the spin orientation or angular momentum of molecular, atomic or nuclear particles in a beam.

In accordance with the present invention, the precession frequency of electrically neutral particles of a beam is utilized in control of the frequency of high-frequency oscillators: more specifically, there is applied to a particle beam an alternating magnetic field of frequency varying with the frequency of an oscillator to change the spin orientation or angular momentum of beam particles and so change the output of an associated detector in dependence upon deviation from the precession frequency of the particles. The variation in output of the detector, which is preferably of the surface ionization type, is utilized to stabilize the frequency of an oscillator which in some methods and systems is the oscillator which affects the frequency of the aforesaid alternating field and which in other methods and systems of the invention is a second oscillator whose frequency is beat against that of the field-varying oscillator to produce frequency-error information which is compared with the detector output for frequency stabilization purposes.

More specifically, in preferred forms of the invention, a frequency-modulated oscillator repeatedly swings the frequency of the aforesaid alternating field over a range of frequencies including the precession frequency of the beam particles so that the modulation-frequency component of the detector may serve as a phase reference for the varying beat-frequency between the frequency-modulated oscillator and the oscillator to be stabilized.

The invention further resides in methods and systems having the novel and useful features hereinafter described and claimed.

For a more detailed understanding of the invention and for illustration of systems embodying it, reference is made to the accompanying drawings in which:

Fig. 1 diagrammatically illustrates a particle beam tube;

Fig. 1a is a detail view on enlarged scale of a portion of Fig. 1 looking in the direction of the arrows 1a—1a.

Fig. 2 is a detail view on enlarged scale of field-producing means utilizable in Fig. 1;

Fig. 3 is a modification of the field-producing means of Fig. 2;

Fig. 4 is an enlarged view of pole tip structure of Fig. 3;

Figs. 5 and 6 are block diagrams of frequency-stabilizing systems using particle beam tubes and high-frequency sweep oscillators.

Similar reference characters are applied to similar elements throughout the drawings.

Figure 7:
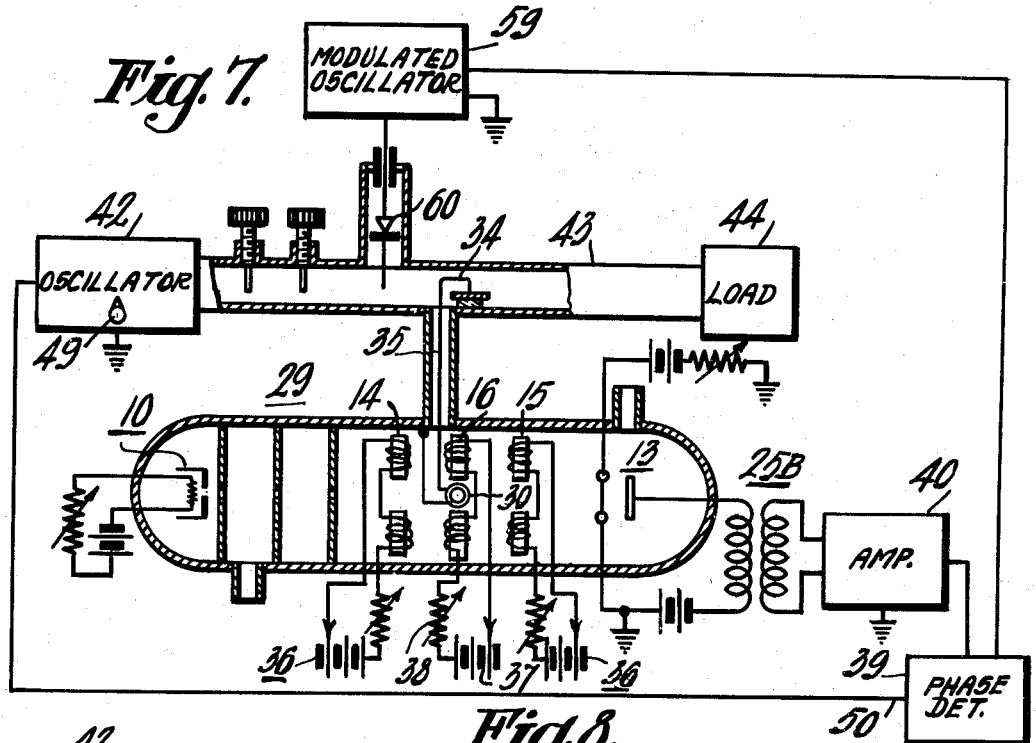
Figs. 7 and 8 are block diagrams of frequency-stabilizing systems using particle beam tubes and low-frequency modulators.

As an understanding of the invention presupposes or requires some knowledge of quantum mechanics, a brief discussion of terms and fundamentals here involved precedes explanation of the utilization of particle beams in frequency-stabilization of oscillators.

An electric dipole consists of a pair of charges equal in magnitude but of opposite sign or polarity ($+q$, $-q$) separated by a fixed distance ($a$). The strength of the dipole or the dipole moment ($\mu$) is (1)
$$\mu = qa$$

Many particles such as atoms and molecules possess or are characterized by a permanent electric dipole moment attributed to the charge distribution which makes a chemical bond and depends upon the character of the atoms joined by the bond. Electric dipole moments encountered in molecules and atoms are given in order of magnitude by a charge separation or internuclear distance slightly less than 1 Å. multiplied by the charge of the electron ($4.80 \times 10^{-10}$ E. S. U.).

A magnetic moment ($\mu$) exists when there is movement of an electric charge in a closed plane or loop. An atom or molecule may therefore have magnetic moments associated with orbital motion of electrons, spin of electrons, spin of the nucleus, and rotation of the molecule itself.

An atomic or molecular magnetic dipole experiences a torque, but no translational force when in a uniform magnetic field. The magnitude of the torque is:

(2)
$$\mu H \cos \theta$$

where H is field intensity; and $\theta$ is the angle between directions of the field and the dipole (restricted to discrete values).

An atomic or molecular magnetic dipole experiences a translational force when in a non-uniform magnetic field. The magnitude of the force is (3)
$$\mu_H \frac{dH}{ds}$$

where $\mu_H$ is the component of $\mu$ in the direction of the field; and $$\frac{dH}{ds}$$

is the gradient of the field.

The angular momentum (G) of a molecule, diatomic or polyatomic, or of an atomic system comprising a nucleus and orbital electrons, is restricted to a set of discrete values given by (4)
$$G = \sqrt{J(J+1)} \frac{h}{2\pi}$$

where J is an integer; and h is Planck's constant.

The component of angular momentum along an axis of symmetry is restricted to a set of characteristic values (5)
$$K \frac{h}{2\pi}$$

where K is an integer equal to or smaller than J (Eq. No. 4).

The angular momentum of a rotation is quantized, that is, restricted to a set of discrete values, with respect to a direction and space determined by the direction of an applied field; and the component of angular momentum in the field direction is confined to a set of values (6)
$$M \frac{h}{2\pi}$$

where M is smaller than or equal to J (Eq. 4).

The angular momentum of an electron is $$\sqrt{\frac{1}{2}\left(\frac{1}{2}+1\right)} \frac{h}{2\pi}$$

and the component thereof in the direction of the applied field is $$\pm \frac{1}{2} \times \frac{h}{2\pi}$$

As previously stated, the electron and many nuclei spin on their own axis, and associated with the spin there exists both a magnetic moment ($\mu$) and an angular momentum (G). The spin quantum numbers, usually designated by the symbol I, of nuclei may be zero or multiples of one-half, depending upon the particular atom or isotope: for example, the spins of $He^4$, $C^{12}$ and $O^{16}$ are zero: the spin of $N^{14}$ is 1, but the spin of $N^{15}$ is ½: the spin of $Kr^{83}$ is 9/2.

The interactions of magnetic fields associated with orbital motion of electrons, electron spin, nuclear spin and molecular spin produce the "fine" and "hyperfine" structure observed in spectroscopic studies of matter. The "fine" structure arises from electron spin interactions with other magnetic fields in the molecule or an atom and the "hyperfine" structure arises from nuclear spin interactions with other magnetic fields in the molecule or atom.

In general, the separation between "fine" line structure corresponds with extremely high frequencies whereas the separation between "hyperfine" lines corresponds with frequencies of lower order. By way of example, the yellow "D" lines of the sodium spectrum are 5890 Å. and 5896 Å., the difference corresponding with 500 kilomegacycles; whereas the "hyperfine" structure characterizing the ground state of sodium corresponds with a frequency separation of 1.770 kilomegacycles. As will later herein appear, this invention is particularly concerned with utilization of interaction productive of the "hyperfine" structure of beam particles for regulation of the frequency of oscillators.

As distinguished from an electron beam, a beam of the type employed herein consists of electrically neutral particles which move at thermal velocities. As diagrammatically indicated in Fig. 1, a narrow beam of such particles may be formed by escape of gas or vapor at low pressure from an oven 10 through a series of collimating slits 11 each having a narrow slit 12 therein. A particle beam is formed and retains its beam characteristics only when the gas or vapor pressure is so low that the mean free path of the particles is large compared to the length of the beam: with a beam-length of about a meter, for example, the pressure beyond the slit 12 should be of the order of $10^{-6}$ millimeters of mercury or less. The tube or envelope enclosing the beam source, the collimating slits and other components, later described, is compartmented with connections 53 to vacuum pump equipment so that the oven pressure may be of higher order of magnitude, for example 0.1 millimeter of mercury.

The oven 10 may conveniently be heated by an electrical resistor 9, and the source material may be a coating on the resistor or on a sleeve surrounding it. High or low oven or emitter temperatures are used depending upon the vapor pressure of the material selected for release of the beam-forming molecules.

The beam B after passing through a series of magnetic fields, later described, arrives at detector 13, which preferably for my purposes is a surface ionization detector, though other known types may be used. The detector 13 shown comprises a heated filament 19 of material whose work function is higher than the ionization potential of the beam particles: specifically filament 19 may be of tungsten whose work function is higher than the ionization potential of certain atoms, Cs, for example, so that when Cs atoms in the beam strike filament 19, heated to a temperature of 1200° C., each atom releases an electron and re-evaporates as a positive Cs ion. The positive ions so released are collected by a plate 22 which is negatively charged as by battery 23, or equivalent, and is provided with an entrance slot for passage of beam molecules or atoms toward filament 19.

The resulting current traversing load-resistor 25 in the detector output circuit produces a potential difference corresponding with the intensity of the beam and is measurable by a sensitive measuring circuit or device generically represented by meter 26.

In passage from their source to detector 13, the beam particles traverse two similar long magnetic fields $H_A$, $H_B$ having the same direction but which are non-uniform, the gradients $$\frac{dH_A}{ds}, \frac{dH_B}{ds}$$

being of opposite direction or sense. The desired gradient is in each case obtained by selection of suitable shape of the pole pieces 14, 14 and 15, 15: suitable pole piece constructions, shown in Figs. 2, 3 and 4, are more fully described in the "American Journal of Physics," vol. 9, No. 6, page 320, and in the "Review of Modern Physics," vol. 18, No. 3, page 330. The construction shown in Fig. 2 is for a coil having two turns 27 and the construction shown in Fig. 3 is for a four-turn coil. Proper direction of the fields may be obtained by suitable connection to the source of exciting current and the desired opposite gradients of the fields obtained by reverse orientation with respect to the beam of the two sets of pole tips. In general, the non-uniform field $H_A$, $H_B$ are of high intensity, as of the order of 1000 gauss or more.

In passing through each of these non-uniform magnetic fields, the beam is subjected to a deflecting force (Eq. 3) which reverses in sign as the molecules or atoms pass from field $H_A$ to $H_B$. The field gradients are so predetermined or adjusted that the beam is "focused" to impinge on detector 13, the dotted line B indicating a possible trajectory for a neutral beam particle. Particles having magnetic moments appreciably different from the focused particles will be to different extent deflected by the field $H_A$, and consequently will not pass through the selector slit 17 positioned intermediate the non-uniform fields $H_A$, $H_B$. The beam particles in passing from the non-uniform field $H_A$ to non-uniform field $H_B$ traverse a uniform field Hc between pole pieces 16, 16. All three of these fields lie in the plane of Fig. 1 and are of the same direction. Intermediate the non-uniform fields, the beam particles also pass through a high-frequency magnetic field at right angles to the uniform field Hc. This high-frequency field may be produced by coil 30, or equivalent, excited as later described from the oscillator to be stabilized or from a second oscillator of the stabilizing system.

In this zone intermediate the two focusing fields, $H_A$, $H_B$, the particles are thus subject to a torque (Eq. 2) and in the absence of spin would simply oscillate about the field direction. However, owing to their spin, the particles precess about the magnetic lines of force with the angle $\theta$ normally remaining constant, which means a constant value of the magnetic quantum M (Eq. 6).

This precession remains constant except when the frequency of the radio-frequency field $H_D$ is equal to the precession-frequency of the particular selected beam particles. In such case, angle $\theta$ abruptly jumps from one discrete value of M to another discrete value thereof, and hence the deflecting force on neutral beam particles in the field $H_B$ is changed. Assuming the beam is focused with coil 30 excited at precession frequency, a very slight increase or decrease in frequency will change the spin orientation of the particles so that under the influence of field $H_B$ they depart from the trajectory B and consequently fewer of them reach the ionizing detector 13. In brief, for frequencies either higher or lower than the precession frequency, the output of detector 13 is sharply reduced. The change in detector output is thus a measure of the frequency change but does not distinguish between increase and decrease in frequency.

When the intensity of the uniform field $H_C$ is high, for example, of the order of several thousand gauss, the precession-frequency is critically dependent upon the field intensity intermediate the non-uniform fields $H_A$, $H_B$, but when the intensity of field $H_C$ is low, for example, a small fraction of a gauss, the precession-frequency of the particles is to inappreciable extent affected by the field intensity. As will later herein be more fully discussed, my invention is particularly concerned with utilization of the particle-beam effects existent when the intensity of field $H_C$ is relatively very low, a fraction of a gauss or less.

The interrelations between applied magnetic field, oscillator frequency and precession frequency are disclosed and claimed in my copending application, Serial No. 39,792 filed July 20, 1948, entitled "Stabilizing Methods and Systems Utilizing Nuclear Precession," now U. S. Patent No. 2,589,494.

Referring to Fig. 5, the oscillator 32 is frequency-modulated in any known suitable manner, as by using a modulating oscillator or a mechanical modulator, repeatedly to sweep over a range of frequencies including the precession-frequency of particles in a particle beam produced within the particle beam tube 29. By way of example, the oscillator 32 may sweep through a range of frequencies including one of the following frequencies: 228.2 megacycles, 461.75 megacycles, 1771.5 megacycles, 3035.7 megacycles or 9192.6 megacycles which are the precession frequencies of $Li^7$, $K^{39}$, $Na^{23}$, $Rb^{85}$ and $Cs^{133}$ respectively. The output of the frequency-modulated oscillator 32 is impressed upon the coil 30 of the particle-beam tube 29 in any suitable manner: in the particular arrangement shown, this transfer of exciting energy is effected by a transmission line 33 which may be an open wire line, a concentric line, or a waveguide, and by a coupling loop or probe 34 connected to coil 30 as by concentric line 35.

For each sweep cycle of the modulating-frequency of oscillator 32, there is produced across the resistor 25, or equivalent impedance in the detector output circuit, a sharp pulse P, whose peak value occurs as the exciting frequency of field $H_D$ passes through the precession-frequency of the selected molecules of the beam. By proper choice of filament composition and temperature, the detector 13 may be used for selective ionization of any of a substantial number of atoms including Cs, Rb, K, Na, Ga, In, Li: moreover all alkali-containing molecules can be detected in the same manner as the respective alkali atoms. The response of the detector is linearly related to the beam intensity; and because of the aforesaid critical relationship between the work function of the filament and alkali atoms, the response is relatively independent of the presence of residual gases.

The pulses P are amplified by a suitable amplifier 40 and impressed upon one input circuit of a phase-detector 39 as a phase-reference rigidly related to the precession frequency of a selected atom or molecule.

The output frequencies of the frequency-modulated oscillator 32 and of the oscillator 42 to be stabilized are impressed upon a mixer 45, which may be of the crystal or diode type, to produce a beat-frequency which varies at the modulating-frequency of oscillator 32. This varying beat-frequency is impressed upon a network 47 to produce a second series of pulses E, each occurring as the beat-frequency passes through a predetermined value. The network 47 may be a sharply tuned intermediate frequency amplifier and demodulator as in my Patent No. 2,702,351, a broad-band amplifier and discriminator network, as disclosed in my Patent No. 2,663,798, or it may be a broad-band amplifier and differentiator network, as disclosed in my copending application Serial No. 73,626, filed January 29, 1949. In all cases, as above stated, each output pulse E passes through a peak value at a time in the modulating cycle definitely related to occurrence of a particular beat-frequency and therefore the pulses P contain error/information corresponding with deviation of the frequency of oscillator 42 from a predetermined value.

The pulses E, preferably after amplification by amplifier 48, are impressed upon a second input circuit of the phase-detector 39, which may, for example, be of any of the types disclosed in my aforesaid copending applications, to produce a direct-current output voltage $E_C$ of sense and magnitude dependent upon the phase relation of the two series of pulses. This direct-current output voltage may be applied by line 50 to regulate the frequency of oscillator 42 in any known manner; as for example, by variation of the potential of a frequency-determining electrode of a klystron or magnetron.

The filament 19 of surface ionization detector 13 may be set to proper operating temperature for the particular atom or molecule selected as a frequency standard by adjustment of the variable current supply source 31, or by other known means, generically represented by a battery and variable resistor. The focusing of the beam upon the filament 19 of the detector may be effected by adjustment of the current supplied to the windings associated with the pole pieces 14, 14—15, 15; as indicated, the current supply for exciting each of these fields may be provided by a variable source 36, generically represented by a variable resistor and a tapped battery. Alternatively, the non-uniform fields may be produced by permanent magnets of proper strength and with properly shaped pole pieces preferably laterally adjustable. In any event, the strength of the non-uniform fields is high, of the order of several thousand gauss.

For use at the highest radio-frequencies now produced, the intensity of uniform field $H_C$ should be very low, less than one gauss, so that actually for my purposes the pole pieces 16, 16 of Fig. 1, may be omitted and this field produced by an air-core coil. Alternatively, the coil, battery 37 and rheostat 38 may be dispensed with and field $H_C$ produced by a small or weak permanent magnet. In any event, the field $H_C$ is preferably of negligible value, for example, of the order of $\frac{1}{20}$ gauss. At such low intensity of the field $H_C$, the interaction of the magnetic moment of the nucleus with the magnetic field of the electrons or of the quadrupole moment of the nucleus with the electric field of the electrons becomes the significant factor affecting precession-frequency. Because of nuclear spin, the ground state of an atom may consist of a set of relatively closely spaced energy levels, each level corresponding to a value of the total angular momentum of the atom. Each value is characterized by a fixed relative orientation of the nuclear spin and the angular momentum of the electrons, either orbital or due to spin. In absence of an external field, the atoms with such "hyperfine" structure energy separations would radiate, finally settling down to their lowest energy state, with the rate of radiation calculable by use of the Einstein coefficient of spontaneous emission. This coefficient at radio-frequencies is extremely small, but the coefficient of induced emission, arising due to application of a high-frequency field by coil 30, is many times larger and produces significant change in the detector output as the applied frequency sweeps through the precession frequency. The precession-frequencies listed above are for a field strength of $H_C$ equal to about $\frac{1}{20}$ gauss. Actually, the effect of the uniform field $H_C$ of low value other than zero is to split each pulse P into two extremely closely spaced pulses due to the "Zeeman" effect. Considered either as a single pulse or a split pulse, the frequency output characteristic of the detector 13 corresponds with a resonant circuit Q of over $10^6$. Therefore the stabilizing system is extremely sensitive to deviations of the frequency of oscillator 42 from the desired value: and, as before stated, it distinguishes between positive and negative deviations.

The precession-frequencies of a substantial number of molecules or atoms are known so that the frequency of an oscillator 42 may be stabilized at any value through a wide range by proper selection or adjustment of the beat-frequency discriminator 47, or equivalent. By way of example, to stabilize the frequency of an oscillator at a frequency of 209 megacycles, the beam may comprise atoms of Li⁷, having a precession-frequency of 228.2 megacycles, in which event the discriminator 47 would be selected to have null output at a frequency of 19.2 megacycles. In such system, the oscillator 32 would be modulated to sweep over the frequency range of from say 218 megacycles to 238 megacycles. If the oscillator 42 is used simply as a signal generator, the modulating-frequency of oscillator 32 may be of any desired value but if the oscillator 42 is used for transmission of intelligence, as speech or video signals, the modulating-frequency for oscillator 32 should be outside of the range of the modulating frequencies of oscillator 42.

Although for most purposes it is desirable to effect automatic control of the frequency of oscillator 42, it may be sufficient in test measurements, for example, manually to adjust the oscillator-frequency from time to time, as by a tuning control 49. In such cases, the phase-detector 39 may be a cathode ray tube either provided with a double gun or a single gun tube with an associated electronic switch. In either case, the pulses P and E are simultaneously observable on the tube and the control 49 may be adjusted to effect or maintain a predetermined positional relation of the pulses. Assuming the pulses are aligned or superimposed for desired normal frequency of oscillator 42, any displacement between the pulses is a direct measure of the frequency-deviation.

The system disclosed in Fig. 6 is similar to that of Fig. 5 except the modulation applied to the stabilized oscillator, in this figure shown as a reflex klystron 42a, is interjected into the stabilizing loop to avoid the effect of such modulation upon the set point frequency. Specifically, as more fully discussed in my Patent No. 2,591,257, the modulating signal applied, as by coupling 46 or equivalent, to the klystron is also applied to a reactance tube circuit, generically represented by block 57, to change the null point frequency of the discriminator 47A upon which the beat-frequency output of the mixer 47 is impressed. As the system of Fig. 6 is in other respects similar to Fig. 5, further discussion thereof appears unnecessary.

In the system shown in Fig. 7, the output of a stabilized oscillator 42 is modulated by impressing it upon mixer 60 upon which is also impressed the output of frequency-modulated oscillator 59. There are thus produced side-band frequencies, one of which is preselected to sweep over a range including the precession-frequency of particles of the particle-beam tube 29. The side-band energy is impressed upon coil 30 of tube 29 by a coupling loop or probe 34. The modulation-frequency component of the output of detector 13, after amplification by amplifier 40, is impressed upon one input circuit of phase-detector 39 upon whose other input circuit is impressed the modulation-frequency of oscillator 59. Accordingly, the direct-current output of the phase-detector or comparator 39 varies in sense and magnitude with shift of the frequency of oscillator 42 from its desired value, and may be applied, as by line 50, to the oscillator to stabilize the operating-frequency of oscillator 42. In this modification of the invention the successive cycles of the modulating-frequency serve as the phase-reference waveforms and the successive sharp output pulses P of detector 13 serve as the pulses containing the frequency/error information.

Figure 8:
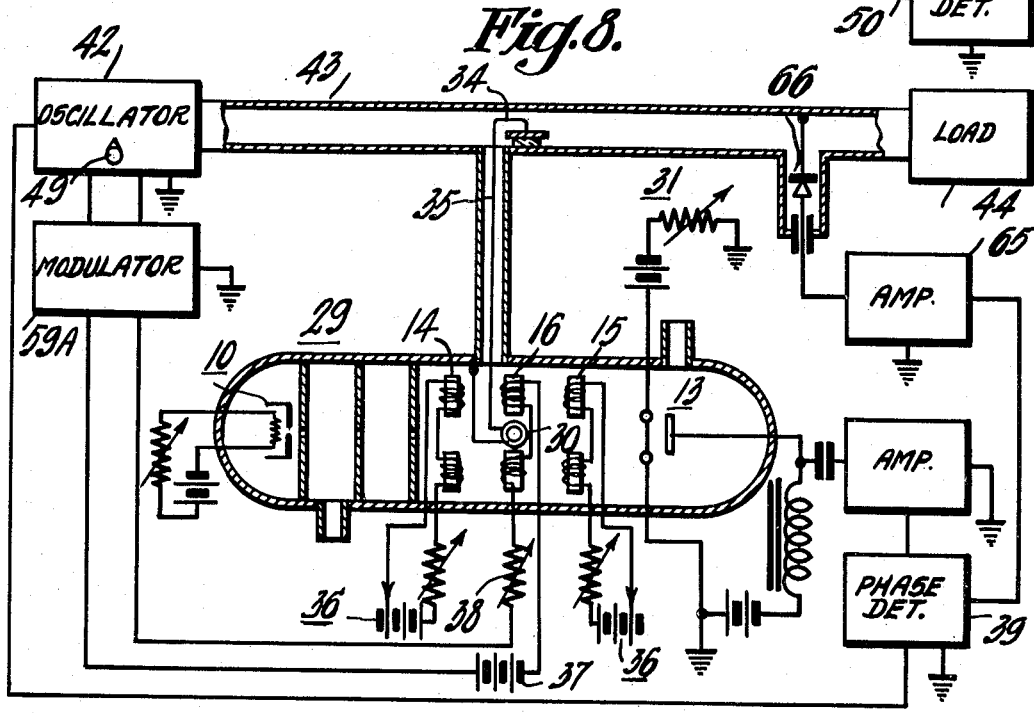

In the modification shown in Fig. 8, the uniform magnetic field Hc is modulated by the output of a low-frequency oscillator 59A which amplitude-modulates the high-frequency oscillator 42 to be stabilized. The field intensity is thus cyclically or repeatedly varied correspondingly to sweep the precession-frequency over a range including the desired operating frequency of oscillator 42. The coil 30 of the beam tube is energized at operating-frequency of oscillator 42. Assuming, for example, that the mean magnitude of the intensity of field Hc is adjusted so that precession then occurs with coil 30 excited at the desired carrier-frequency of oscillator 42; a shift of the carrier-frequency to higher or lower value will cause a change in nuclear orientation to occur earlier or later in the modulating cycle. The output of detector 13 therefore contains the frequency/error information as a phase-shift of its modulating-frequency component. This component is impressed on one input circuit of the phase comparator 39 upon whose other input circuit is impressed a phase-reference voltage of modulating-frequency. Preferably, this phase-reference voltage is derived by impressing the amplitude-modulated output of oscillator 42 upon demodulator 66. The modulating-frequency component of the output of demodulator 66 is amplified by amplifier 65 and impressed on a second input circuit of the phase comparator 39.

Thus, as in the modifications previously described, there is produced a unidirectional control voltage which varies in sense and magnitude with variation between the operating-frequency of the oscillator 42 and the precession-frequency of particles of a molecular beam.

The present methods and systems, like those of my Patent No. 2,589,494, utilize nuclear precession, but specifically differ, in that in the instant application wherein there is employed a particle beam, there are no interparticle collisions to reduce the effective Q and the Doppler effect is also eliminated because the particles are traveling in one direction at right angles to the applied field.

It shall be understood the invention is not limited to the specific systems illustrated and described and that changes and modifications may be made within the scope of the appended claims.

What is claimed is:

1. Apparatus for utilizing a particle beam to control the frequency of an oscillation generator including a detector for said beam, means for applying to the beam intermediate its source and said detector a uniform alternating magnetic field of frequency having fixed relation to the frequency of the generated oscillations to vary the detector output in accordance with deviation of the applied frequency from the precession frequency of particles of said beam, and means for applying the detector output as a control effect to said generator to minimize said frequency deviation.

2. Apparatus for stabilizing the mean carrier frequency of an oscillator by a particle beam including means for modulating the oscillator, a surface ionization detector, means for applying to the beam intermediate its source and said surface ionization detector a uniform alternating magnetic field of frequency varying with the modulating frequency over a range including the precession frequency of particles of the beam, and means for controlling the frequency of said oscillator to maintain a fixed phase relation between the modulating frequency and the modulation component of the output of said detector.

3. Apparatus for utilizing a particle beam in stabilization of the frequency of an oscillation generator including means for frequency-modulating the output of said generator to sweep over a range of frequencies, a surface ionization detector, means for applying to the beam intermediate its source and said surface ionization detector an alternating magnetic field having fixed phase, relation to the modulating frequency over a corresponding range of frequencies including the precession frequency of particles of said beam, and means for controlling the mean frequency of said oscillation generator to maintain a fixed phase relation of the output of said detector to the modulating frequency.

4. Apparatus for utilizing a particle beam in stabilization of the frequency of an oscillation generator including means for frequency-modulating the output of a second generator to sweep over a range of frequencies, means for mixing the outputs of said generators to produce a beat frequency varying over a second range of frequencies, a beam detector, means for applying to the beam intermediate its source and said detector an alternating magnetic field of frequency varying over one of said ranges of frequencies and including the precession frequency of particles of said beam, means for demodulating oscillations varying over the other range of frequencies to produce reference pulses at the modulating frequency, and means for controlling the frequency of the first-named generator to maintain a fixed phase relation between the output of said detector and said reference pulses.

5. Apparatus for utilizing the spin frequency of particles in stabilization of the frequency of an oscillation generator including a beam detector, means for directing a beam of said particles toward said detector, means for successively subjecting said beam to non-uniform fields having oppositely directed gradients to focus the beam on said detector, means for applying to the beam intermediate said focusing fields a uniform alternating magnetic field of frequency having fixed relation to the frequency of said generator and at least closely approximating the precession frequency of particles in the beam to produce an output dependent upon the difference between the spin frequency and the field frequency, and means for utilizing the variations in output of said detector to minimize deviation from a fixed relation between the oscillator frequency and the molecular spin frequency.

6. Apparatus for utilizing a particle beam in stabilization of the frequency of an oscillation generator including a surface ionization detector, means for directing a beam of said particles toward said surface ionization detector, means for successively subjecting said beam to non-uniform magnetic fields having oppositely directed gradients to focus the beam on said detector, means for frequency-modulating the generated oscillations, means for applying to the beam intermediate said focusing fields an alternating magnetic field of frequency having fixed relation to the oscillator frequency and varying therewith over a range including the precession frequency of particles in the beam to vary the detector output at modulating frequency, and means for controlling the oscillator frequency to maintain a fixed phase relation between the modulating frequency and the output of said detector.

7. Apparatus for utilizing the spin frequency of particles in stabilization of the frequency of an oscillator generator including a surface ionization detector, means for directing a beam of said particles toward said surface ionization detector, means for successively subjecting said beam to non-uniform magnetic fields having oppositely directed gradients to focus the beam on said detector, means for frequency-modulating the generated oscillations, means for applying to the beam intermediate said focusing fields an alternating magnetic field of frequency having fixed relation to the oscillator-frequency and varying therewith over a range including the precession frequency of particles in the beam, means for producing a series of pulses containing frequency, versus/error information including means for applying to the beam intermediate said focusing fields a uniform magnetic field and means for varying the intensity of said uniform field at the modulating frequency, means for demodulating the generator output to produce a series of phase-reference pulses, and means for controlling the oscillator-frequency to maintain a fixed phase relation of the two series of pulses.

8. Apparatus for utilizing the spin frequency of particles in stabilization of the frequency of an oscillation generator including a beam detector, means for directing a beam of said particles toward said detector, means for successively subjecting said beam to non-uniform magnetic fields having oppositely directed gradients to focus the beam on said detector, a second generator, means for frequency-modulating oscillations produced by said second generator to sweep over a range of frequencies, means for mixing the outputs of said generators to produce beat-frequency oscillations varying over a second range of frequencies, means for applying to the beam intermediate said focusing fields an alternating field of frequency varying over one of said ranges which includes the precession frequency of particles in said beam to produce a train of pulses at the modulating frequency, means for demodulating the oscillations varying over the other range of frequencies to produce a second train of pulses at the modulating frequency, and means for controlling the frequency of the first-named generator to maintain a fixed phase relation between said trains of pulses.

9. Apparatus as in claim 8 including means whereby modulation applied to vary the frequency of the first-named generator is also applied to shift the phase of the pulses derived from the varying beat-frequency to prevent interaction of said modulation upon the frequency stabilization.

10. A system for stabilizing the frequency of an oscillator comprising a particle beam tube having focusing magnets spaced along the path of the beam between the beam-source and a surface ionization detector, means for producing between said focusing magnets an alternating magnetic field of frequency having fixed relation to the oscillator-frequency and at least closely approximating the precession frequency of particles of the beam whereby the detector output varies with the oscillator frequency, and frequency-regulating means for said oscillator controlled by the output of said detector to maintain constancy of the relation between said oscillator and precession frequencies.

11. A system for stabilizing the frequency of an oscillator comprising a particle beam tube having focusing magnets spaced along the path of the beam between the beam source and a surface ionization detector, frequency-modulating means for varying the frequency of the generated oscillations repeatedly to sweep over a range of frequencies, means for producing between said focusing magnets an alterating field of frequency having fixed relation to the oscillator frequency and sweeping a range of frequencies including the precession frequency of particles of the beam in synchronism with the modulating-frequency, and frequency-regulating means for said oscillator controlled by the output of said detector.

12. A system for stabilizing the frequency of oscillations produced by an oscillation generator comprising a particle beam tube having focusing magnets spaced along the beam path between the beam source and a surface ionization detector, frequency-modulating means for varying at modulating-frequency the frequency of the generated oscillations, means for producing between said focusing magnets an alternating field of frequency having fixed relation to the oscillator frequency and varying therewith to sweep a range of frequencies including the precession frequency of particles of the beam, means for producing between said focusing magnets a uniform magnetic field of intensity varying in synchronism with said modulating-frequency, demodulating means for the frequency-modulated oscillations, and frequency-control means for said oscillation-generator responsive to variations of the phase relation between the modulation-frequency components of the respective outputs of said detector and said demodulating means.

13. A system for stabilizing the frequency of oscillations produced by an oscillation-generator comprising a particle-beam tube having focusing magnets spaced along the beam path between the beam source and a surface ionization detector, frequency-modulating means for varying at modulating-frequency the frequency of the generated oscillations, said detector providing a modulation-frequency output component, means for producing intermediate said focusing magnets an alternating field varying with the oscillator-frequency to sweep a range of frequencies including the precession frequency of particles of the beam, and frequency-control means for said oscillation-generator responsive to variations of the phase relation between the output of said frequency-modulating means and the modulating-frequency component of the output of said detector.

14. A system for stabilizing the frequency of oscillations produced by an oscillation-generator comprising a particle-beam tube having focusing magnets spaced along the beam-path between the beam-path and a surface ionization detector, said detector providing a modulation-frequency output component, a frequency-modulated oscillator, means for producing intermediate said focusing magnets an alternating field varying in synchronism with the frequency-modulated oscillator over a range of frequencies including the precession frequency of particles of the beam, a mixer for the outputs of said generator and said modulated oscillator for producing a beat-frequency varying at the modulating-frequency, and frequency-control means for said oscillation-generator responsive to the variations of the phase relation between said beat-frequency and modulating-frequency component of the output of said detector.

15. A system for stabilizing the frequency of an oscillator comprising a particle beam tube having focusing magnets spaced along the path of the beam between the beam-source and a neutral particle detector, means for producing between said focusing magnets an alternating magnetic field of frequency having fixed relation to the oscillator-frequency and at least closely approximating the precession frequency of particles of the beam whereby the detector output varies with the oscillator frequency, and frequency-regulating means for said oscillator controlled by the output of said detector to maintain constancy of the relation between said oscillator and precession frequencies.

16. Apparatus for utilizing a beam of particles having dipole moments to control the frequency of an oscillation generator including a detector for said beam, means for applying to the beam intermediate its source and said detector a uniform alternating field of frequency having fixed relation to the frequency of the generated oscillations to vary the detector output in accordance with variation of the applied frequency, and means for applying the detector output as a control effect to said generator to minimize said frequency variation.

No references cited.